US007520780B2

(12) United States Patent
Daubigney et al.

(10) Patent No.: US 7,520,780 B2
(45) Date of Patent: Apr. 21, 2009

(54) FRAUD PREVENTING SECURITY ARRANGEMENT FOR AN ELECTRICAL CONNECTOR FOR CHIP CARDS

(75) Inventors: Patrick Daubigney, Authume (FR);
Rodolphe Gie, Besançon (FR);
Guillaume Pinon, Pesmes (FR);
Damien Duprat, Dole (FR)

(73) Assignee: CoActive Technologies, Inc., Newton, MA (US)

( * ) Notice: Subject to any disclaimer, the term of this patent is extended or adjusted under 35 U.S.C. 154(b) by 0 days.

(21) Appl. No.: 11/949,456

(22) Filed: Dec. 3, 2007

(65) Prior Publication Data

US 2008/0132119 A1     Jun. 5, 2008

(30) Foreign Application Priority Data

Dec. 1, 2006   (FR) .................................. 06 55259

(51) Int. Cl.
    *H01R 24/00*   (2006.01)
(52) U.S. Cl. ...................................................... 439/630
(58) Field of Classification Search ................ 439/625, 439/630, 638, 718, 159, 488–489, 59, 64, 439/76.1, 78, 83, 92–93, 945; 361/737
    See application file for complete search history.

(56) References Cited

U.S. PATENT DOCUMENTS

| 6,783,926 | B2 * | 8/2004 | Reece ........................ 430/630 |
| 6,984,152 | B2 * | 1/2006 | Mowery et al. ............. 439/638 |
| 7,448,914 | B2 * | 11/2008 | Calvas et al. ................ 439/638 |

FOREIGN PATENT DOCUMENTS

| DE | 4312905 A1 | 10/1994 |
| DE | 202006009983 U1 | 8/2006 |

\* cited by examiner

*Primary Examiner*—Edwin A. Leon
(74) *Attorney, Agent, or Firm*—Pepper Hamilton LLP

(57) ABSTRACT

A security arrangement for an electrical connector for connecting an electrical memory card to contacts wherein the connector includes a bottom plate made of insulating material including a series of blades for contact with a land of the card. The arrangement includes a protection element which bears at least one protection conductor circuit that at least partly surrounds the bottom plate of the connector. The bottom plate of the connector includes at least one additional contact blade including a top portion for connecting with the protection circuit of the protection element and a bottom portion for connecting with the at least one track connected to a detection circuit.

11 Claims, 12 Drawing Sheets

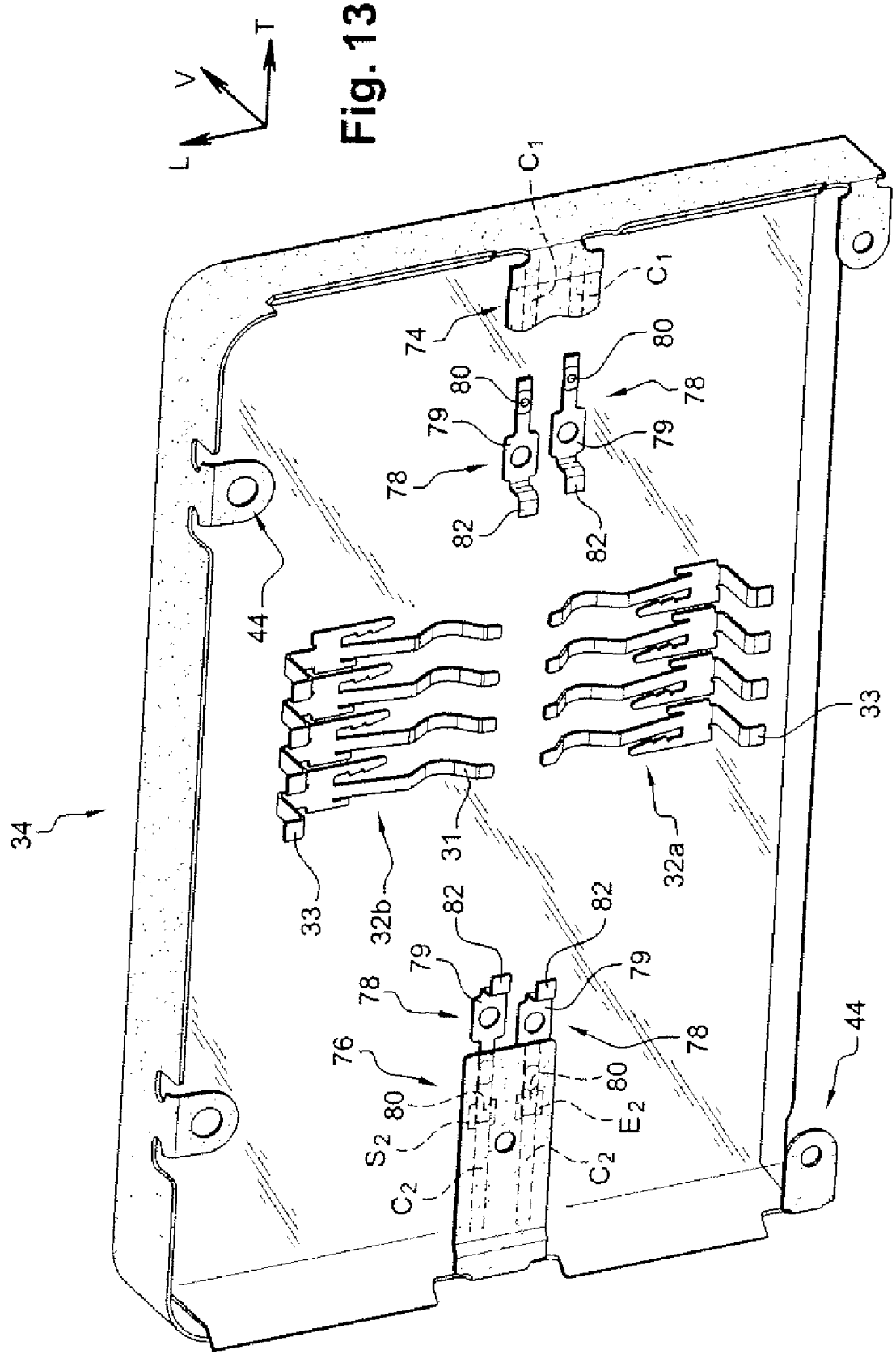

FRAUD PREVENTING SECURITY ARRANGEMENT FOR AN ELECTRICAL CONNECTOR FOR CHIP CARDS

CROSS-REFERENCE TO RELATED APPLICATION

This application claims the benefit of priority to French Patent Application No. 0655259 filed Dec. 1, 2006, which is hereby incorporated by reference in its entirety.

BACKGROUND

Various fraud attempts on read/write devices equipped with a connector notably include a step aiming to reach an I/O contact blade. Such a maneuver is decisive in enabling chip card fraud. To this end, a fraudster can, for example, drill a hole in the insulating block bearing the contact blades and/or in the printed circuit board which, on its top face, is equipped with the connector.

Various arrangements that provide means to enable detection and prevention of fraud attempts have been used to enhance the overall security of read/write devices. For example, French Patent No. 2,875,036 describes an electrical connector including a metal plate forming a protective cage which extends facing a portion opposite the I/O contact blade, and which is electrically linked to a ground blade of the connector. Accordingly, any attempt to reach the I/O contact blade by means of a metal object, such as a metal drill, results in an electrical connection between the protective plate, which is connected to ground, and the first contact blade. As such, a short circuit is produced by grounding the first contact blade. A signal can be generated to represent a fraud attempt.

However such an arrangement does not effectively protect against fraud attempts by intrusion via the top and/or side faces of the duly protected connector. Moreover, the arrangement is not being concealed, which can enable a fraudster to more easily circumvent the arrangement. In addition, fraud detection occurs only "through" the blades of the connector, which can provoke a deterioration of the signal processing circuits to which the connector is linked. Furthermore, connecting the plate to the ground blade can result in complex structures and arrangements.

SUMMARY

In an embodiment, a device for an electrical connector for connecting an electrical memory card with contacts includes a bottom plate comprising an insulating material including a series of blades for contacting a land of the memory card. Each contact blade may be elastically deformable, arranged horizontally, and include a top portion for connecting with a contact land of the memory card. The contact land may project from the top face of the bottom plate of the connector. A bottom portion of each contact blade may connect with a conductive track on one side of a bottom printed circuit board including the connector.

The device may include a protection element including at least one protection conductor circuit that at least partly surrounds the bottom plate of the connector and connects to at least one track on a printed circuit board connected to a detection circuit.

In an embodiment, a security arrangement including a bottom plate of the connector includes at least one additional contact blade. The at least one additional contact blade may include a top portion for connecting with the protection circuit of the protection element and a bottom portion for connecting with the at least one track connected to a detection circuit.

In an embodiment, the bottom connecting portion of the additional contact blade may be similar to the blades for contact with the card. The bottom connecting portions may be coplanar and configured to be soldered and/or brazed to an associated track on the face of the printed circuit board.

The protection element may include a tab including at least one end of the protection circuit that extends through a slot in the bottom plate of the connector. The top connecting portion of the additional contact blade may be elastically deformable and may project into the slot so as to be electrically connected with the at least one end of the protection circuit when the tab is inserted into the slot. The top connecting portion of the additional contact blade may be oriented downwards and the at least one end of the protection circuit may be borne by the top face of the tab.

The contact blades for the land of the memory card may be in contact with a blade-bearing block made of insulating material on the bottom plate of the connector. The additional contact blade may be in contact with a cover on the bottom plate of the connector.

The protection element may include a protective cover on one side of the connector, and the protection circuit may be arranged inside the protective cover. The protective cover may include at least one fixing tab extending between the bottom plate of the connector and the top face of the printed circuit board. The protective cover may include a hole through which a post passes to fix the bottom plate of the connector. The hole may be surrounded by at least one track of the protection circuit.

The protection element may be produced in the form of a flexible or semi-rigid sheet. The protection element may include a protecting film of insulating material on which at least one track of the protection circuit snakes. The electrical continuity of the tracks of the protection circuit on the film and the protection element may be provided using at least one electrically conductive bridge. The conductive bridge may be electrically cut when the protection element and the film are vertically separated from each other.

The protection element may include several separate protection circuits each arranged snake-wise to form a protection circuit.

BRIEF DESCRIPTION OF THE DRAWINGS

FIG. 13 is a bottom perspective view which illustrates the protective cover and the arrangement of the contact blades and of the additional contact blades of the connector of FIG. 12.

DETAILED DESCRIPTION

In the description that follows, identical, similar or analogous components are designated by the same reference numbers.

As a non-limiting example, to assist in understanding the description and the claims, the terms "vertical," "horizontal," "bottom," "top," "up," "down," "transversal," "longitudinal," and so on will be adopted with reference to the L, V, T trihedron indicated in the Figures.

Figure 1:
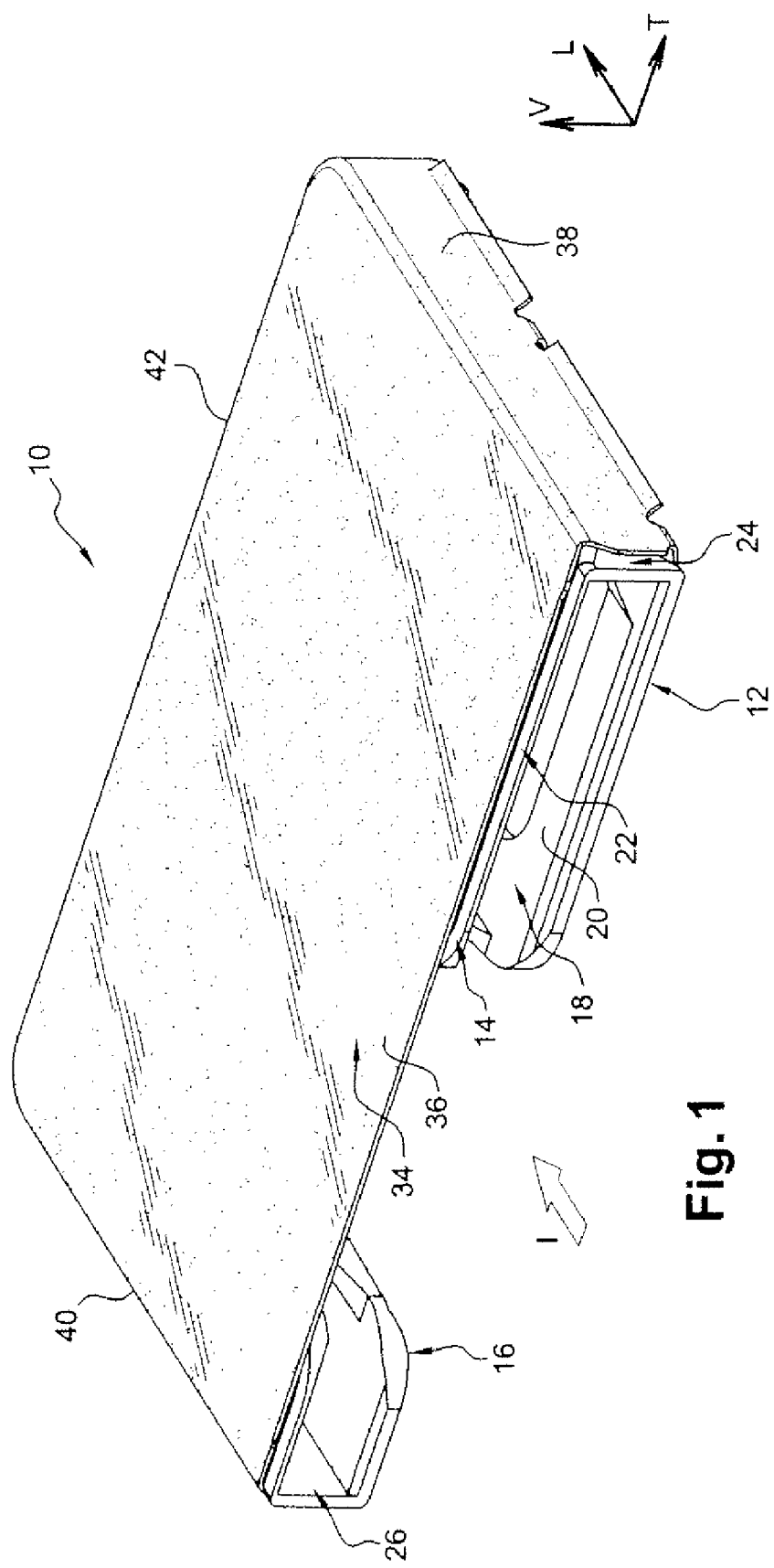
FIG. 1 is a top perspective view, which illustrates an arrangement according to a first embodiment, including a connector for a chip card topped by a protective cover.

FIG. 1 and FIG, 2 represent a connector 10 having a body 12, or housing, which is implemented, for example, in an insulating material, such as plastic. The body 12 may be produced, for example, by molding. The general design of the connector 10 with its insulating body 12 may correspond to the connector described in U.S. Pat. No. 5,775,949. However, other connectors may be used within the scope of this disclosure.

The body 12 may include a top cover 14 and a bottom horizontal plate 16 which, once fitted together, delimit between them a longitudinal slot 18 for inserting, from front to rear in the direction indicated by the arrow "I" in FIG. 1, a chip card (not represented). In an embodiment, the top cover 14 may be molded together with the bottom horizontal plate 16, so that the body 12 forms a single piece.

Figure 2:
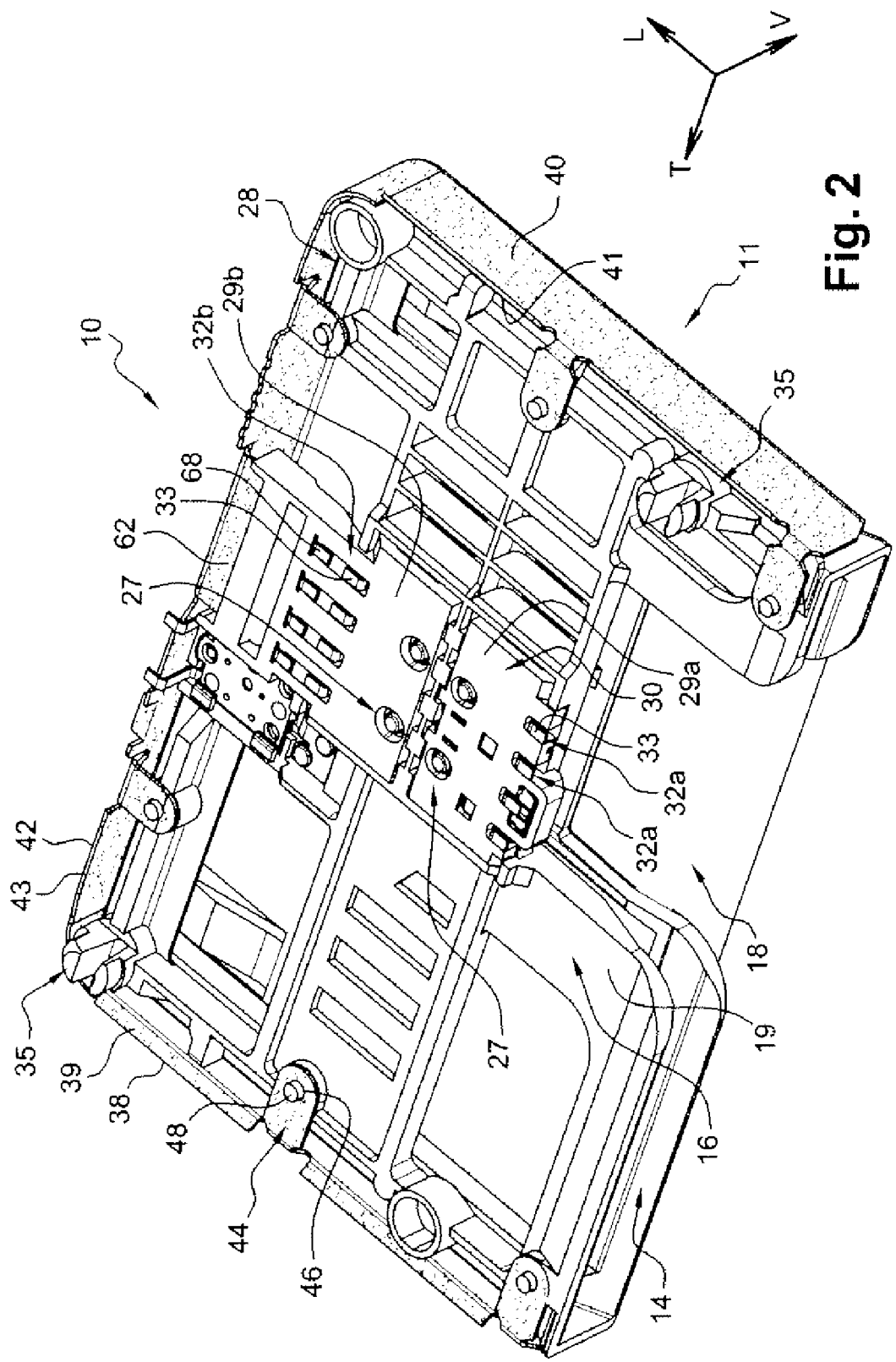
FIG. 2 is a bottom perspective view of the connector of FIG. 1, illustrating the fixing and electrical connection of the protective cover to the contact blades by the bottom plate.

The bottom plate 16 of the connector 10 also makes it possible to fit and fix the connector 10 on a printed circuit board (PCB) of a read/write device (not represented), using, for example, two vertical posts 35, such as those represented in FIG. 2. The chip card may include, on a bottom face oriented facing a top face 20 of the bottom horizontal plate 16 of the connector 10, conductive lands.

As shown in FIG. 1 and FIG. 2, the top cover 14 may include a top horizontal plate 22, two vertical lateral side plates 24 and 26 which extend in the longitudinal direction "L," and a bottom vertical lateral plate 28 which extends in the transverse direction "T."

The two lateral plates 24 and 26 may oppose each other and provide lateral guidance of the chip card in the longitudinal direction "L," limiting its transverse displacement. The bottom plate 28 may be perpendicular to the lateral plates 24 and 26 and delimit the bottom of the card insertion slot 18.

Figure 8:
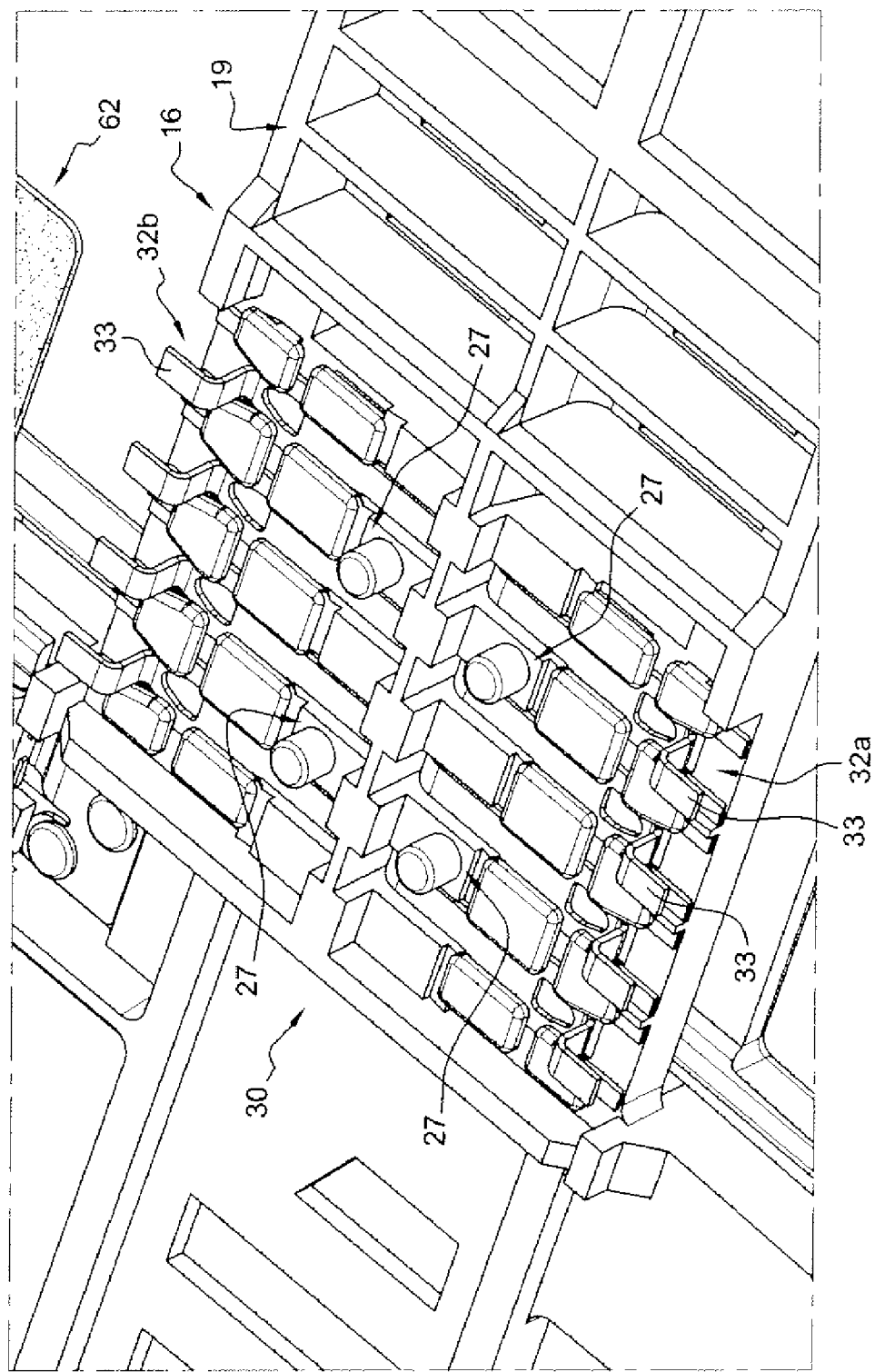
FIG. 8 is a bottom perspective view which illustrates a block supporting the contact blades of the bottom plate of the connector of FIG. 1.

As shown in FIG. 8, the bottom plate 16 of the connector 10 forms a blade-bearing insulating block 30 that supports a front group of elastically deformable electrical contact blades 32a and a rear group of elastically deformable electrical contact blades 32b. The bottom plate 16 may have a central part in transverse direction "T." The overall design of the blade-bearing block 30 and blades 32a, 32b may include the blade-bearing block described and represented, for example, in U.S. Pat. No. 6,447,338. However, other connectors and blocks may be used within the scope of this disclosure.

Figure 9:
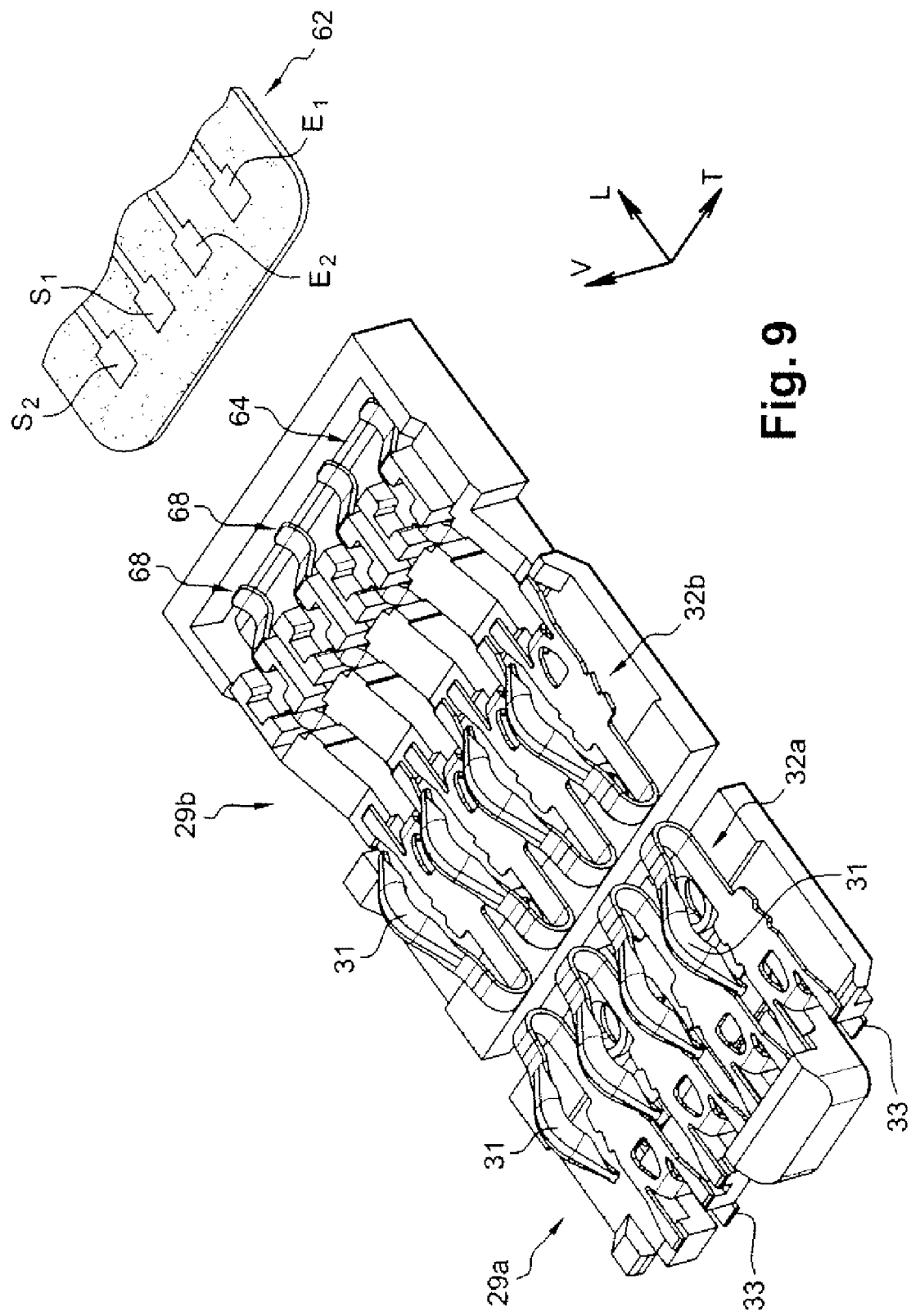
FIG. 9 is a top perspective view which illustrates a front cover and a rear cover for the contact blades of the connector of FIG. 1.
Figure 10:
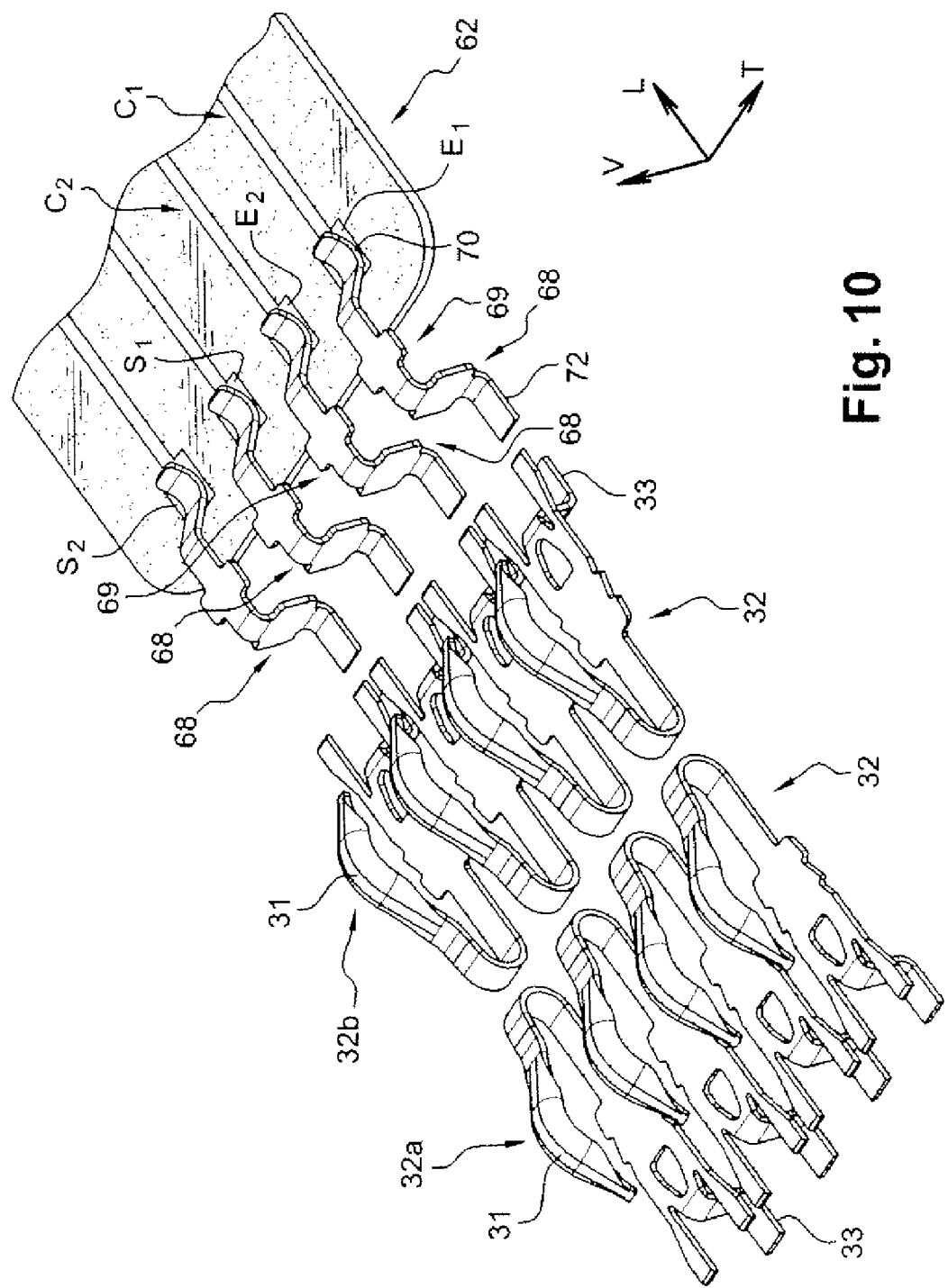
FIG. 10 is a top perspective view which illustrates the contact blades and the additional contact blades of the connector of FIG. 1.

Each contact blade 32a, 32b, which are represented in detail in FIG. 9 and FIG. 10, is disposed in parallel to the other contact blades and includes a top portion 31 for electrical connection with a contact land of the chip card that projects from the top face 20 of the horizontal bottom plate 16 of the connector 10. Furthermore, each blade 32a, 32b includes a bottom portion 33 for electrically connecting the contact blade 32a, 32b with a conductive track on the top face of the printed circuit board (PCB) which includes the connector 10 to be connected to the read/write device.

The front group of contact blades 32a may be partly covered by a front cover 29a and the rear group of contact blades 32b may be covered by a rear cover 29b, as illustrated in detail in FIG. 9. Each cover 29a, 29b may be interposed between the groups of blades 32a, 32b respectively and the printed circuit board (PCB) and may include, for example, four holes opening out vertically, for the bottom connecting portions 33 of the contact blades 32a, 32b to pass through. In an embodiment, the bottom connecting portions 33 may be connected to a conductive track on the top face of the PCB. Each cover 29a, 29b may further include two holes. Each hole may include a crimped post 27 that extends vertically downwards from the bottom face 19 of the plate 16 of the connector 10 to fix the covers 29a, 29b to the plate 16. In an embodiment, at least one of the two covers 29a, 29b may, for example, support a metal protective cage or a metal protective plate, such as those described in French Patent Nos. 2,875,036 or 2,875,037.

Embodiments described herein seek to preferentially protect all the contact blades 32a, 32b against a fraud attempt by intrusion, for example, by creating an electrical contact with the contact blades 32a, 32b by means of a metal object or by drilling the connector 10. To this end, the arrangement includes a protection element, such as the protective cover 34 represented in FIG. 3.

The protective cover 34 may be made of an insulating material, such as plastic. The protective cover 34 may overlap the top cover 14 in order to cover each plate 22, 24, 26, 28 of the top cover 14, as illustrated in FIG. 1 and FIG. 2. The protective cover 34 may include a horizontal top wall 36, two vertical lateral walls 38, 40 and a vertical bottom wall 42.

Figure 3:
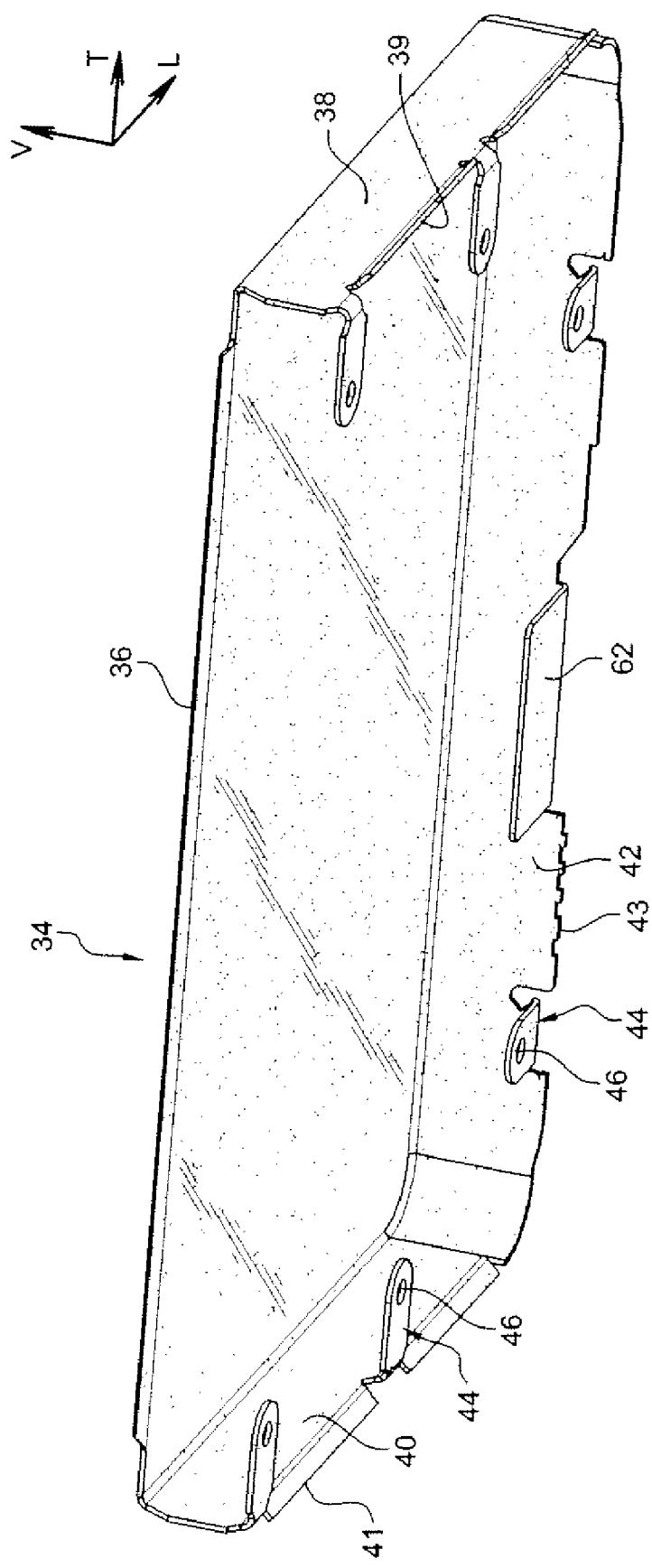
FIG. 3 is a bottom perspective view which illustrates the protective cover of FIG. 1.

In an embodiment, the protective cover 34 has, for example, three pairs of fixing tabs 44, such as those represented in FIG. 3. Each tab 44 may extend horizontally from a bottom edge 39, 41, 43 of a wall 38, 40, 42 vertically with respective to the protective cover 34 between the bottom plate 16 of the connector 10 and the top face of the printed circuit board (PCB). Each tab 44 may include a hole 46 which is passed through by a fixing post 48 associated with the bottom plate 16 of the connector 10, as shown in FIG. 1.

The posts 48 may each extend vertically from the bottom face 19 of the bottom plate 16, and may include a free end which is crushed and crimped on the associated tab 44, to ensure the fixing of the protective cover 34 to the connector 10.

Before being fixed to the connector 10, the protective cover 34 initially takes the form of a pressed part, which is, for example, obtained by swaging. In an embodiment, the initial form of the protective cover 34 can be obtained by molding. In this initial form, the walls 38, 40, 42 of the protective cover 34 and its fixing tabs 44 extend perpendicularly to the top wall 36. The protective cover 34 may be mounted on the connector 10 in this initial form, and the fixing tabs 44 of the protective cover 34 may be bent back against the bottom plate 16 of the connector 10.

Figure 4:
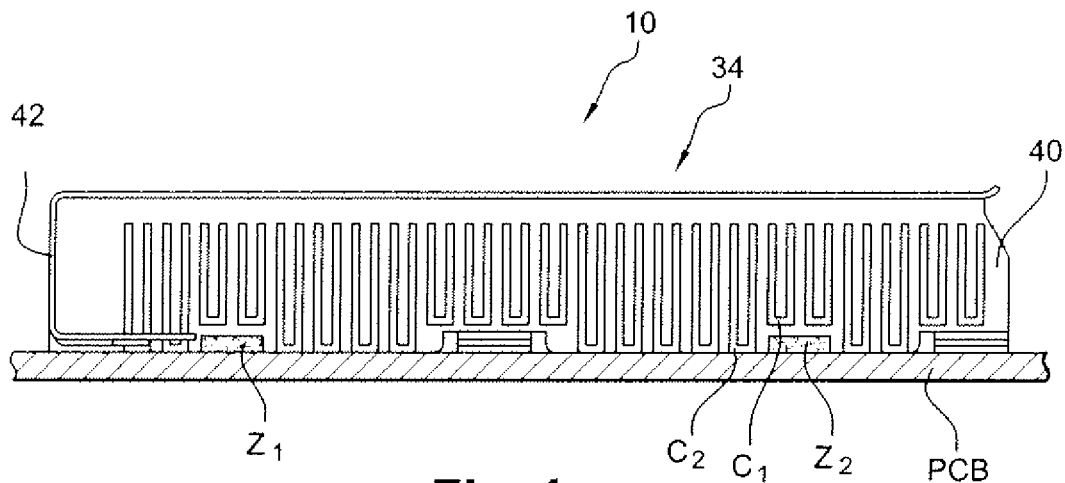
FIG. 4 is a diagrammatic cross-sectional view which illustrates the arrangement of the tracks of the protection circuits on the vertical walls of the protective cover of FIG. 1.
Figure 5:
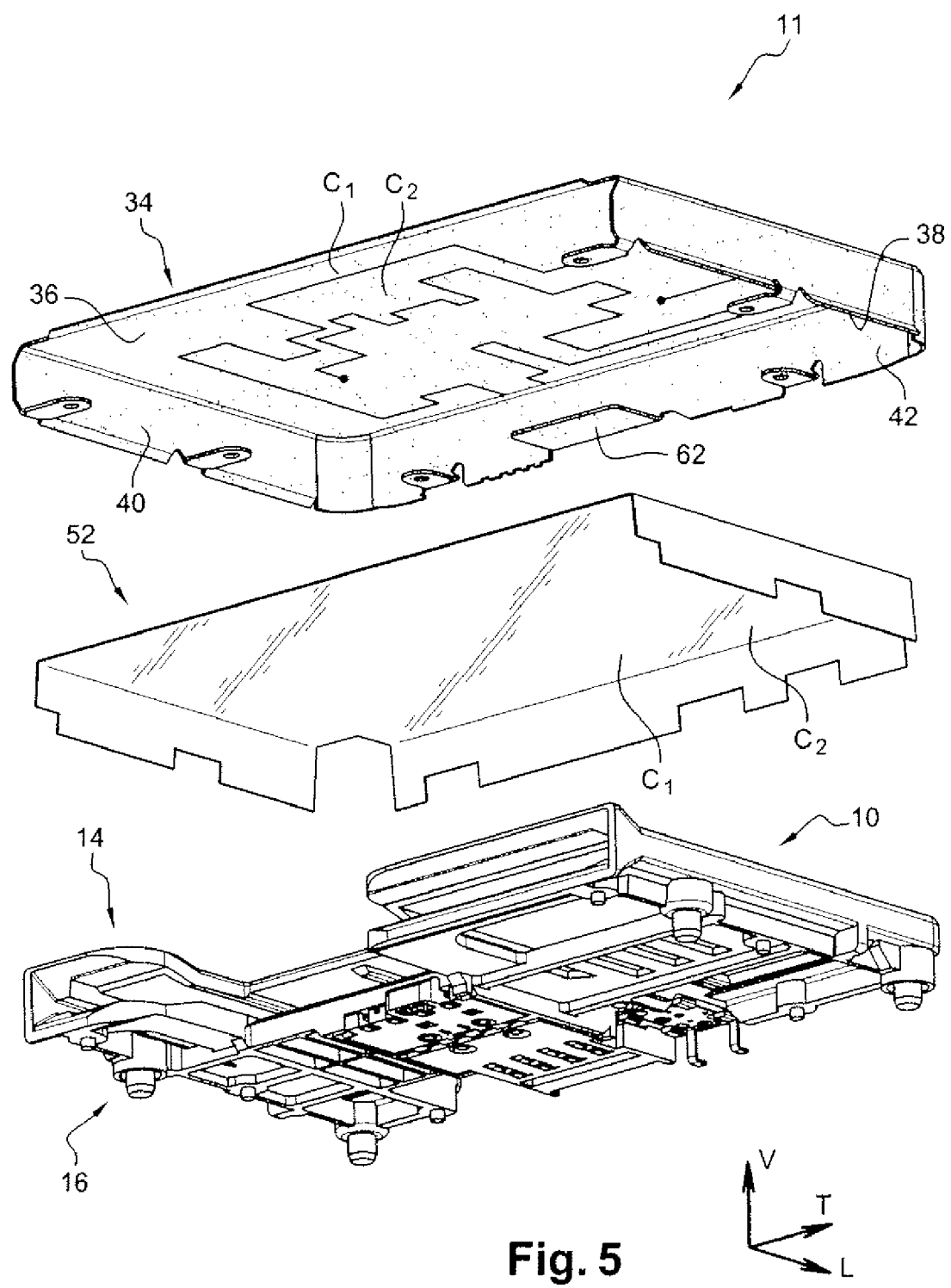
FIG. 5 is a perspective exploded view which illustrates the protective cover of FIG. 1 and a protective film.

As illustrated in FIG. 4 and FIG. 5, the bottom face of the protective cover 34 may include electrically conductive tracks which belong to protection circuits C1 and C2 and which snake without crossing. More specifically, the tracks of the protection circuits C1 and C2 may extend on the internal face of the horizontal wall 36, of the two vertical lateral walls 38, 40 and of the bottom wall 42 of the protective cover 34 to form a protection network. The two lateral walls 38, 40 and the bottom wall 42 of the protective cover 34 may extend overall to the top face of the printed circuit board (PCB). In an embodiment, the protection circuits C1, C2 may be, for example, printed using conductive ink. In an alternate embodiment, the protective circuits C1, C2 may be chemically machined from a solid layer made of electrically conducting material. As will be discussed in more detail, the protection circuits C1, C2 are connected to a detection circuit located on the top face of the printed circuit board (PCB) that can emit a signal representative of a fraud attempt.

Figure 6:
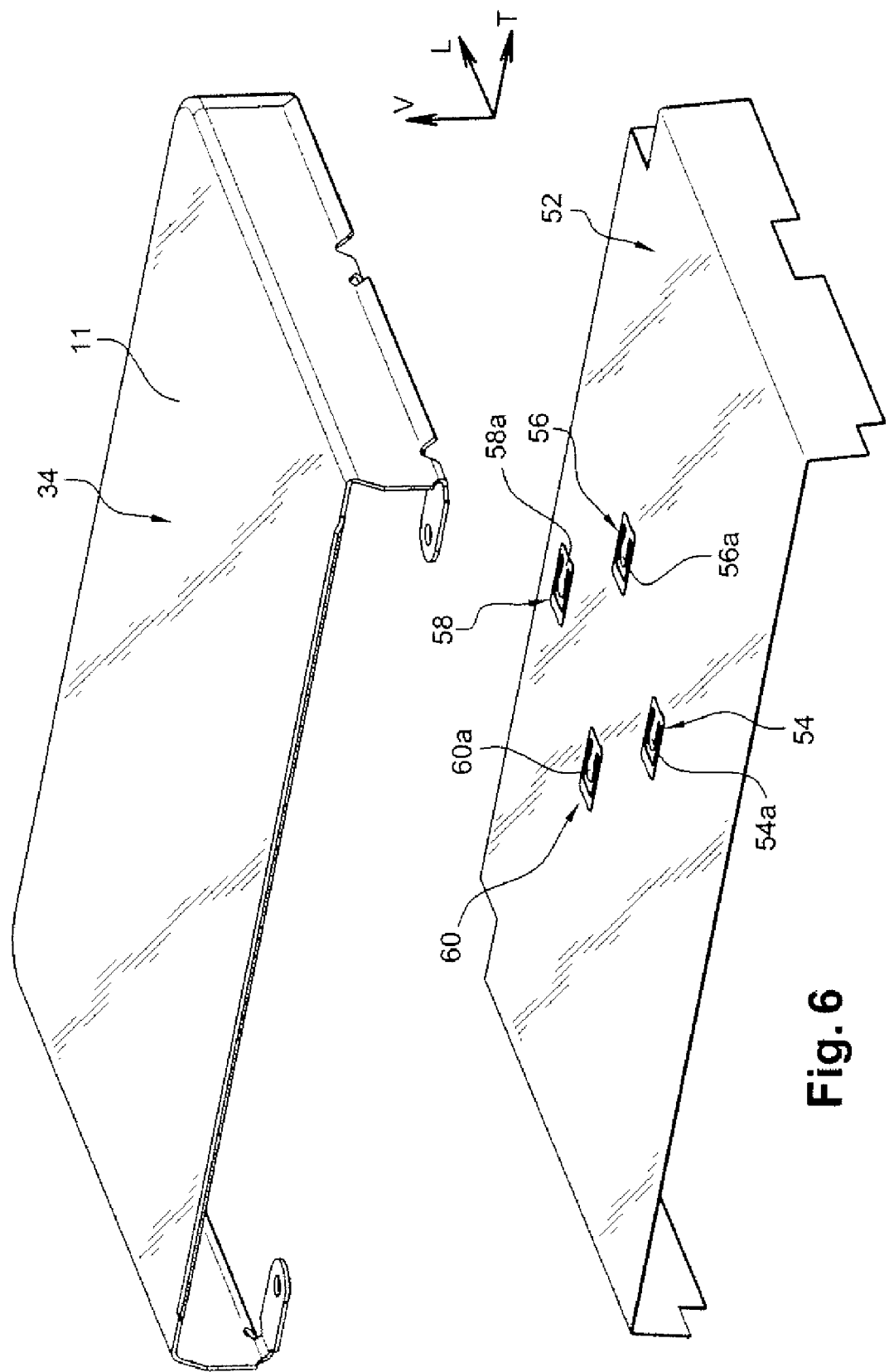
FIG. 6 is an exploded perspective diagrammatic view which illustrates the conductive bridges for connecting electrical tracks of the protective cover of FIG. 1 to electrical tracks of the protective film.

Furthermore, as can he seen in FIG. 5 and FIG. 6, the internal face of the protective cover 34 includes a protective film 52 comprising an insulating material, such as plastic. The internal face of the film 52 includes a set of tracks which snake, are produced using an electrically conductive material, such as copper, and belong to one of the protection circuits C1, C2. The protective film 52 may be bonded to the internal face of the protective cover 34 by means of, for example, an adhesive tape or glue. Thus, the protective cover 34 includes two protection circuits C1, C2, the tracks of which extend, overlaid, on the internal face of the protective cover 34 and on the internal face of the protective film 52, forming a protection network.

Figure 7:
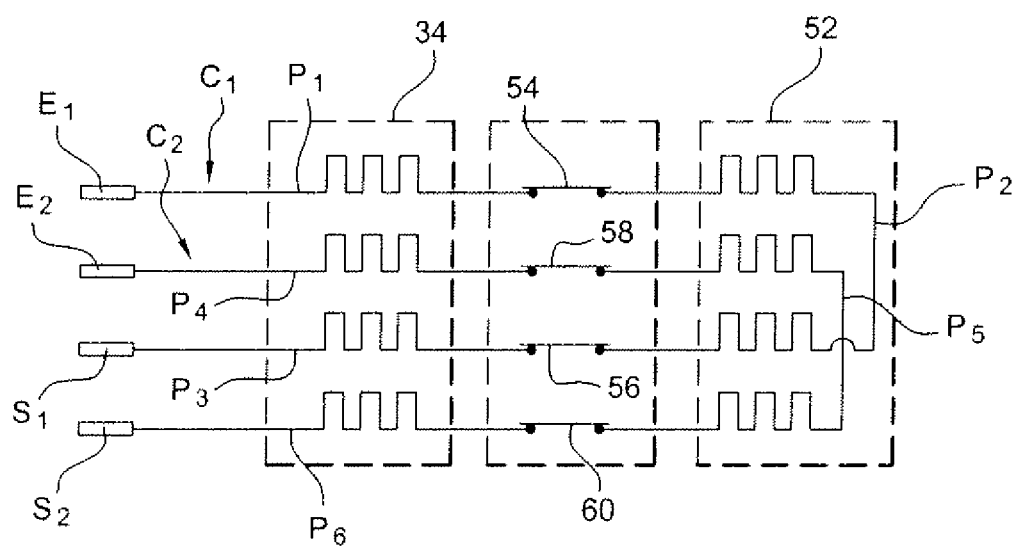
FIG. 7 is an electrical circuit diagram which illustrates the routing of the electrical tracks of two protection circuits which extend on the protective cover and the protective film.

The diagram of FIG. 7 illustrates the arrangement of the various tracks of the protection circuits C1, C2. The first protection circuit C1 includes a first track P1 which snakes on the protective cover 34 from an input end E1, to a first electrically conductive bridge 54. The first conductive bridge 54 is connected to a second track P2 of the protection circuit C1, which snakes on the film 52 to a second conductive bridge 56. Finally, the second conductive bridge 56 is connected to a third track P3 of the protection circuit C1, which snakes on the protective cover 34 to an output end S1.

The second circuit C2 is produced in the same way; it includes a fourth track P4 which snakes on the protective cover 34 from an input end E2, to a third electrically conductive bridge 58. The third conductive bridge 58 is connected to a fifth track P5 of the protection circuit C2, which snakes on the film 52 to a fourth conductive bridge 60. Finally, the fourth conductive bridge 60 is connected to a sixth track P6 of the protection circuit C2, which snakes on the protective cover 34 to an output end S2.

Advantageously, the designs of the circuits C1 and C2 are different and complementary, such that the circuits C1 and C2 form a dense network of conductive tracks.

As shown in FIG. 6, the bridges that provide the electrical continuity of the tracks may each include a terminal 54*a*, 56*a*, 58*a*, 60*a* made of a conductive material, such as copper. Each terminal 54*a*, 56*a*, 58*a*, 60*a* of the bridge may extend horizontally on the top face of the film 52, and include a first face in electrical contact with a track of the film 52 and a second opposing face in contact with a complementary track of the protective cover 34, such that, when the film 52 and the protective cover 34 are vertically offset from one another, the bridges do not provide electrical continuity. As such, at least one protection circuit C1, C2 may be an open circuit.

The protective cover 34 may include a tab 62, such as the one illustrated in FIG. 3, which extends horizontally from the bottom edge 43 of the bottom wall 42 of the protective cover 34. The tab 62 of the protective cover 34 may be inserted into slot 64 of the rear cover 29*b*. The slot 64 may include a transverse opening which is arranged in a rear edge 66 of the rear cover 29*b*. When inserted, tab 62 may contact the contact blades 32*b*.

Figure 11:
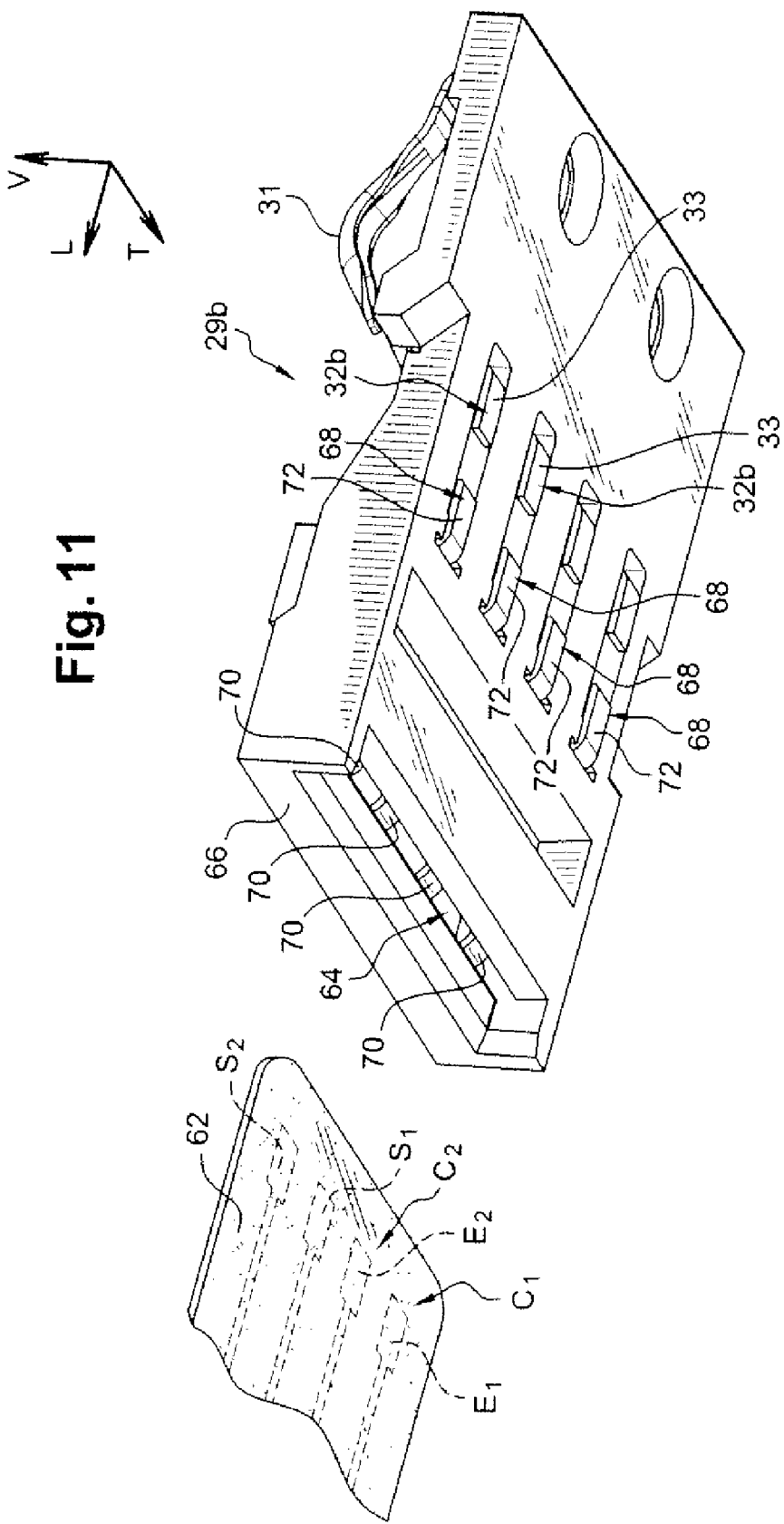
FIG. 11 is a bottom perspective view which illustrates the rear cover of FIG. 9 bearing the additional contact blades of the connector of FIG. 1.

The tab 62 of the protective cover 34 may include, on its top face, the input ends E1, E2 and the output ends S1, S2 of each of the two protection circuits C1 and C2, in the manner of a connecting ribbon cable. In an embodiment, the bottom plate 16 of the connector 10 includes, for example, four additional contact blades 68 for connecting the input ends E1, E2 and output ends S1, S2 with an associated track connected to the detection circuit. The four additional contact blades 68 may be located on the rear cover 29*b*, as shown in FIG. 9 and FIG. 11.

When the tab 62 of the protective cover 34 is arranged in the slot 64 of the rear cover 29*b*, each of the input ends E1, E2 and the output ends S1, S2 may be electrically connected with the associated additional contact blades 68, as illustrated in FIG. 10. Each additional contact blade 68 may extend in a vertical plane and may include, at a first end, a bottom portion 72 connecting with an associated track of the detection circuit. The bottom connecting portion 72 of each additional contact blade 68 may extend horizontally in the same plane as the bottom connecting portions 33 of the contact blades 32*a*, 32*b* so as to solder or braze each bottom connecting portion 33, 72 of the blades 32*a*, 32*b*, 68 to an associated track of the printed circuit board (PCB).

Each additional contact blade 68 may include, at a second end, a top portion 70 connecting with an input end E1, E2 or output end S1, S2 of the protection circuits C1 and C2. Each top connecting portion 70 may be concave, incurved downwards, and may project in the slot 64 for insertion of the tab 62 of the protective cover 34, so as to electrically connect to an associated input end E1, E2 or output end S1, S2. To this end, each top connecting portion 70 may be elastically deformed, for example, when passed through the tab 62 of the protective cover 34.

Figure 12:
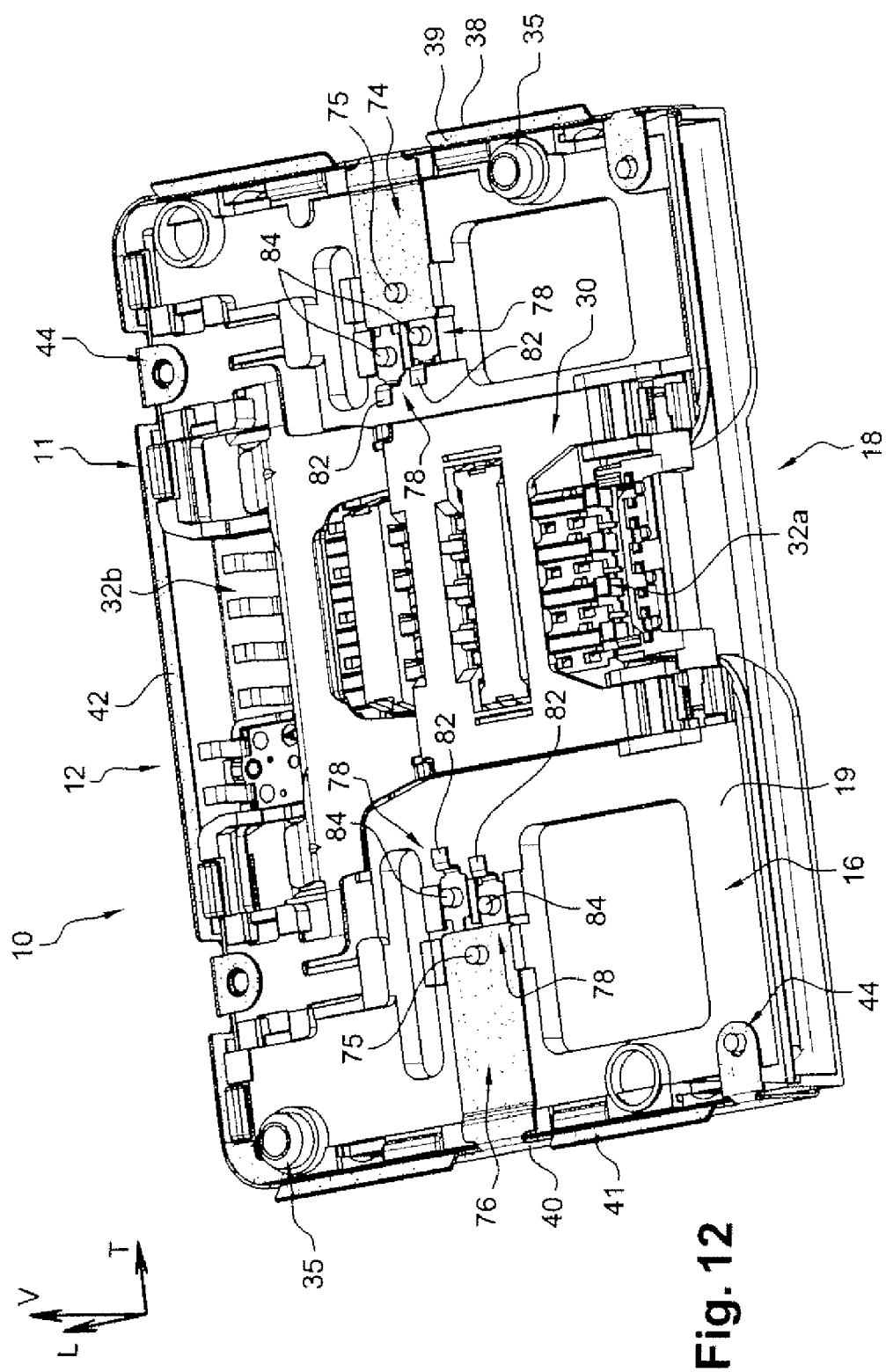
FIG. 12 is a bottom perspective view which illustrates a second embodiment of the arrangement.

Each additional contact blade 68 may include a bent middle portion 69 which connects the top connecting portion 70 with the bottom connecting portion 72. Each middle portion 69 may include a vertical strand and a horizontal strand. Each strand may include transverse projections in order to ensure the fixing and the positioning of the blade 68, such as in the rear cover 29*b*. The four additional contact blades 68 may be identically shaped, produced by bending and made of an electrically conductive material, such as copper or copper alloy. According to a second embodiment represented in FIG. 12 and FIG. 13, the protective cover 34 includes a first tab 74 and a second tab 76 each of which extends horizontally and transversally from a bottom edge 39, 41 respective to the vertical walls 38, 40 of the protective cover 34 and facing the bottom face of the bottom plate 16 of the connector 10. The first tab 74 includes, on its top face, the input end E1 and the output end S1 of the protection circuit C1 and the second tab 76 includes, on its top face, the input end E2 and the output end S2 of the protection circuit C2.

According to this second embodiment, the bottom plate 16 of the connector 10 includes, for example, four additional contact blades 78, which extend in opposing pairs in a transverse direction. Each additional contact blade 78 may include, at a first end, a bottom portion 82 for connecting with an associated track of the detection circuit. The bottom connecting portion 82 of each additional contact blade 78 may extend horizontally in the same plane as the bottom connecting portions 33 of the contact blades 32a, 32b so as to solder or braze each bottom connecting portion 33, 72 of the blades 32a, 32b, 78 to an associated track of the printed circuit board (PCB).

Each additional contact blade 78 may further include a middle portion 79 which ensures the fixing and the positioning of the blade 78 on the bottom plate 16 of the connector 10. To this end, each middle portion may include a hole passed through by a post 84 which extends vertically downwards from the bottom face 19 of the bottom plate 16. Advantageously, the free end of each post 84 may be crushed and crimped with the associated additional contact blade 78 to ensure the fixing of the additional contact blades 78 on the connector 10.

Each additional contact blade 78 may further include, at a second end, a top portion 80 for connecting with an associated input end E1, E2 or output end S1, S2 of the protection circuits C1 and C2. Each top connecting portion 80 may be concave, incurved downwards, so as to be electrically connected to the associated input end E1, E2 or output end S1, S2.

The additional contact blades 78 may be identically shaped, produced by bending, and made of an electrically conductive material, such as copper or copper alloy.

The tab 74 and the tab 76 may each include a hole configured to be passed through by a post 75 extending vertically from the bottom face 19 of the bottom plate 16 of the connector 10. Advantageously, the free end of each post 75 may be crushed and crimped on the associated tab 74, 76, so as to lock the tabs 74, 76 on the connector 10.

When a fraudster tries to drill the top cover 14 to reach one of the contact blades 32a, 32b of the connector 10, such as by using a metal drill, the fraudster may cut at least one of the tracks of circuit C1 and/or C2. As such, current no longer circulates in the broken track, and the detection circuit detects the discontinuity of the cut track and emits a signal representative of a fraud attempt. This detection mode has the advantage of being effective even if the device used to drill is not made of conductive material.

If a drill instead damages one or more tracks of the circuit C1 and/or C2 by reducing its cross-sectional area at the point of drilling, the fraud attempt may be detected by measuring the variation of resistance of the damaged track because the resistance of a wire, or of a track may be reduced. This may occur because the resistance is inversely proportional to its cross-sectional area. As such, the resistance of the damaged track may be less than its initial resistance.

In a third scenario, the fraudster may drill a hole with a metal drill between two separate tracks of the circuit C1 and/or C2. In this case, the two drilled tracks may come into electrical contact via the metal drill, which enables the detection circuit to detect a short circuit between the two tracks and emit a signal representative of a fraud attempt.

In a fourth scenario, the fraudster may try to remove the protective cover 34 from the connector 10, which cannot be done without tearing at least one fixing tab 44 of the protective cover 34 because the hole 46 of each fixing tab 44 which is passed through by a post 48 of the connector 10 is surrounded by at least one track of one of the two protection circuits C1, C2. The detection circuit may detect the discontinuity of the cut track and emit a signal representative of a fraud attempt.

In a fifth scenario, the fraudster may try to shunt a part of one of the two protection circuits C1 or C2 in order to be able to cut the shunted part without detection by the detection circuit. However, because the tracks of the protection circuits C1 and C2 cannot be discerned from one another, the fraudster risks creating a short circuit that can be detected by the detection circuit.

In at least these five detection cases, any communication between the chip card and the read/write device may be prevented to avoid any fraud or any spoofing.

Furthermore, the tab 62 of the protective cover 34 which includes the input ends E1, E2 and the output ends S1, S2 of each of the two protection circuits C1 and C2 is ideally arranged under the connector 10. The tab 62 may be arranged inside the protective cover 34, such that access to the tab 62 is limited. Tabs 74, 76 of the protective cover 34 may be similarly well protected.

According to a variant of an embodiment represented in FIG. 4, the external face of the protective cover 34 may include an external electrically-conductive protection layer comprising, for example, copper, electrically connected to ground. To this end the external protection layer of the protective cover 34 may include two soldering areas electrically connected to ground via a track of the top face of the printed circuit board (PCB).

As can he seen in FIG. 4, the portions of the bottom face which are facing the two soldering areas Z1, Z2 do not include conductive tracks of the protection circuits C1, C2 in order to avoid soldering the tracks to ground. Such an embodiment may offer an additional level of protection.

If a fraudster drills the protective cover 34 using, for example, a metal drill, at least one track of one of the protection circuits C1, C2 may come into electrical contact with ground via the external protection layer and via the metal drill. This may enable the detection circuit to detect a short circuit between the two tracks and emit a signal representative of a fraud attempt.

By way of variants not represented, there are various embodiments of connector including a blade-bearing block 30, independently of the design of the card guidance means, the latter being able to be fitted in any orientation relative to the blade-bearing block 30. Similarly, the variants of embodiment described previously can be combined.

Similarly, the tracks of the protection circuits C1 and C2 can be formed by deposition techniques like pad printing or screen printing using a conductive ink or paint. The arrangement makes it possible to produce an electrical connector for connecting a chip card which is fitted with an effective protective cover for detecting fraud attempts, notably through the arrangement of the additional contact tabs. In practice, the additional contact tabs are arranged so as to be protected by the protective cover. Furthermore, the assembly formed by a connector and a protective cover produced according to the embodiments forms a product which is able to operate after a simple operation connecting the product to the PCB.

What is claimed is:

1. A device having an electrical connector for connecting an electrical memory card with contacts, wherein the electrical connector comprises a bottom plate made of insulating material comprising a plurality of first contact blades for contacting at least one land of the electrical memory card, wherein each first contact blade is elastically deformable and wherein each first contact blade is substantially parallel to each other first contact blade, wherein each first contact blade comprises:

a top portion for connecting with at least one contact land of an electrical memory card, wherein the top portion projects from a top face of the bottom plate of the electrical connector; and a bottom portion for connecting with at least a conductive track on one side of a printed circuit board (PCB) including the electrical connector;

the device comprising a protection element including at least one protection circuit that at least partly surrounds the bottom plate of the electrical connector and that is connected to at least one track on one side of the PCB connected to a detection circuit, wherein the bottom plate of the electrical connector comprises a second contact blade, wherein the second contact blade comprises:

a top portion for connecting with the at least one protection circuit of the protection element; and a bottom portion for connecting with said at least one track connected to the detection circuit.

2. The device of claim 1 wherein the bottom portion of each first contact blade and the bottom portion of the second contact blade are coplanar and are each soldered or brazed to an associated track on the PCB.

3. The device of claim 1 wherein the protection element comprises one of a flexible or semi-rigid sheet.

4. The device of claim 1 wherein the protection element comprises a plurality of protection circuits arranged snakewise to form a protection network.

5. The device of claim 1 wherein the protection element comprises a tab including at least one end of the protection circuit and extending through a slot in the bottom plate of the electrical connector, and wherein the top portion of the second contact blade is elastically deformable and projects into the slot to be electrically connected with said at least one end of the protection circuit when the tab is inserted into the slot.

6. The device of claim 5 wherein the top portion of the second contact blade is oriented downwards and said at least one end of the protection circuit is located on a top face of the tab.

7. The device of claim 1 wherein the contact blades for the at least one land of the memory card are located on a blade-bearing block in the bottom plate of the electrical connector, wherein the blade-bearing block comprises an insulating material, and wherein the second contact blade is located on a cover on the bottom plate of the electrical connector.

8. The device of claim 7 wherein the protection element comprises a protective cover disposed on a first side of the electrical connector, and wherein the protection circuit is disposed inside the protective cover.

9. The device of claim 8 wherein the protective cover comprises at least one fixing tab extending between the bottom plate of the electrical connector and a top face of the PCB, and wherein the fixing tab comprises a hole passed through by a post for fixing the bottom plate of the electrical connector, and wherein the fixing tab is surrounded by at least one track of the protection circuit.

10. The device of claim 1 wherein the protection element comprises a protecting film of insulating material on which at least one track of the protection circuit snakes, and wherein the electrical continuity of the at least one track of the protection circuit located on the film and at least one track located on the protection element is provided by means of at least one electrically conductive bridge.

11. The device of claim 10 wherein the at least one electrically conductive bridge is electrically cut when the protection element and the film are vertically separated from each other.

* * * * *